(No Model.)
J. S. GRABILL.
ELEVATOR POWER FOR HAY CARRIERS.
No. 296,950. Patented Apr. 15, 1884.
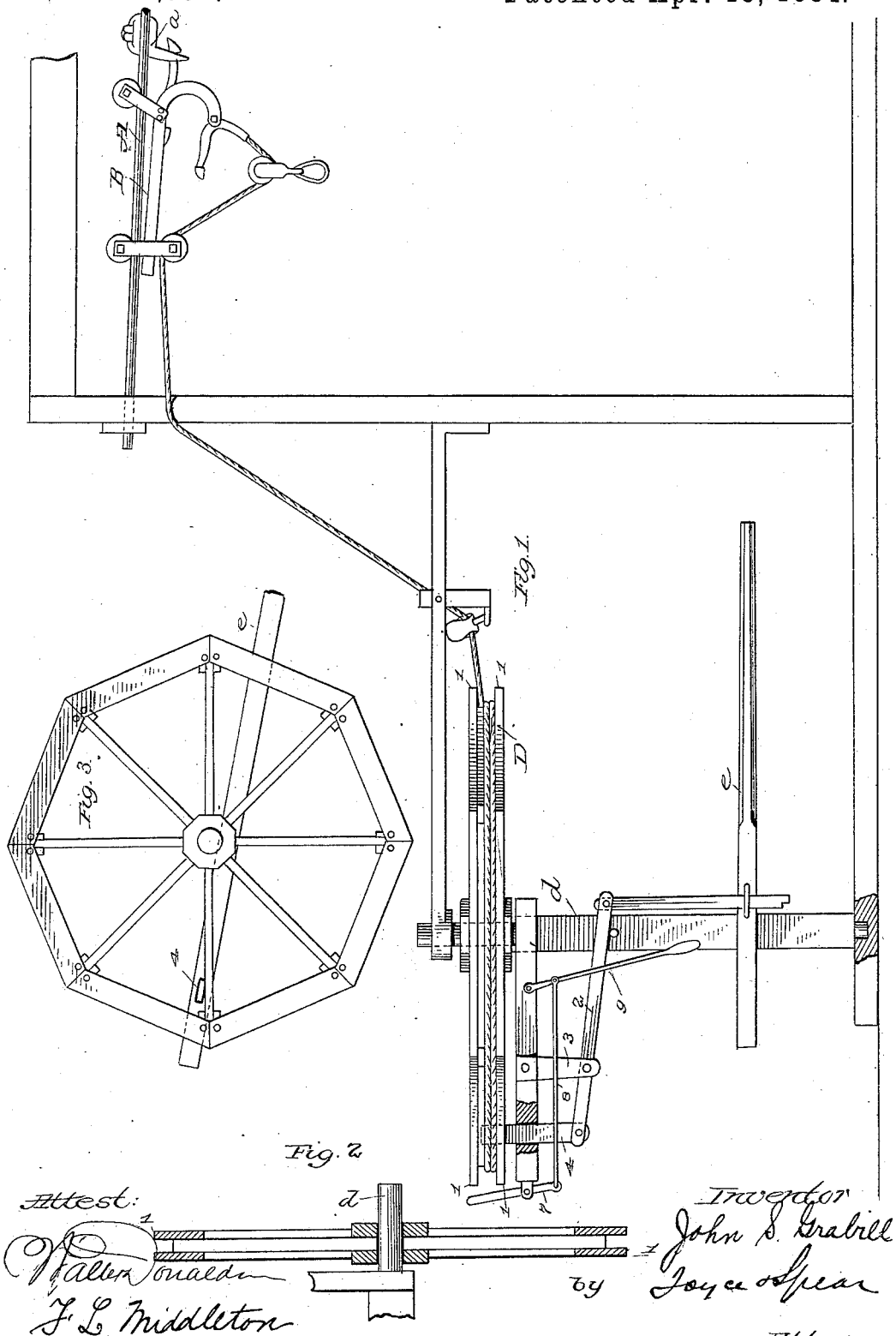

United States Patent Office.

JOHN S. GRABILL, OF HAYESVILLE, OHIO, ASSIGNOR OF TWO-THIRDS TO FRANCIS E. MYERS AND PHILIP A. MYERS.

ELEVATOR-POWER FOR HAY-CARRIERS.

SPECIFICATION forming part of Letters Patent No. 296,950, dated April 15, 1884.

Application filed December 26, 1883. (No model.)

*To all whom it may concern:*

Be it known that I, JOHN S. GRABILL, of Hayesville, in the county of Ashland and State of Ohio, have invented a new and useful Improvement in Elevator-Powers for Hay-Carriers; and I do hereby declare that the following is a full, clear, and exact description of the same.

My invention is an improvement in hay elevators and carriers, having for its principal objects, first, to lessen the amount of rope required in hoisting and carrying the hay; second, to avoid the necessity of causing the horse to walk back to the starting-point after the load is dropped, in order to allow the carrier to move back to the position of the wagon, the horse being required to walk only when raising the load, and stands still while the fork and carrier return. Finally, my object is to remove the rope to an overhead position, where it will be entirely out of the way.

In the accompanying drawings, Figure 1 shows the frame of a barn with my improved apparatus in position. Fig. 2 is a section of the wheel, and shows the disconnecting device; and Fig. 3 is a plan of the same.

The track A is of ordinary construction, suited to a form of carrier such as that shown at B. This form is the same as that shown in application by P. A. Myers, filed September 11, 1883, and allowed September 25, 1883; but any that will operate in the same general way in connection with the drum or wheel may be used.

The catch or knocker is shown at *a*, and the hook striking it catches and at the same time releases the fork. The rope moves beneath the track, and, passing over suitable sheaves, is connected to a wheel or drum, D, which is adapted to turn loosely on a vertical shaft having its bearings in the frame-work above and floor below. The wheel has flanges 1 1, to hold the rope as it is wound upon it. The shaft *d* is provided with a pole, *e*, to which the horse is attached, and on the shaft also may be placed a driver's seat, this being an ordinary circular horse-power. Near this seat is the operating-bar, which works suitable connecting devices, whereby the wheel D is connected to the shaft at will. These devices consist (in the form shown) of a lever, 2, pivoted in a bracket, 3, and having a stop-arm, 4, which can be pushed up into range with the spokes of the wheel. Plainly, the devices for connecting and disconnecting the wheel may be varied greatly.

The operation of the apparatus may be readily understood. The wheel being connected to the shaft, a load of hay taken on the fork, the horse is started, and turns the shaft and wheel, whereby the load is drawn up till the carrier is released, when the load is drawn along to the position required, when the attendant causes it to drop in the usual way. The driver then releases the wheel and stops the horse, and the carrier runs down the track to its position over the driver. When the fork is again loaded, the driver again puts the wheel into connection with the shaft and starts the horse.

The wheel may be placed at any convenient point either in the barn or outside it.

The shaft *d* may vary in length to suit the barn or place where it is used. In a bank-barn, a shaft twenty feet in length may be run through a twelve-inch hole at one side of the barn-floor to the ground-floor, and the horse-lever may be attached below. The upper end of the shaft may reach to the joist above, and the wheel will work above the plane of the load of hay.

In city stables the wheel may be above the ceiling and the shaft run through the ceiling and be removed when not in use.

In order that the wheel may not run back too fast by its own momentum and the impulse it receives from the rope, I provide a tension or brake lever.

I have shown a convenient form of brake-lever and connections in Fig. 1. A brake-lever, 7, is pivoted in the end of the bar which supports the locking-lever. It is connected by a rod, 8, to a hand-lever, *g*, in reach of the driver when in his seat, and he may, by pulling the lever, apply the brakes as the carrier runs back, thus preventing the wheel from running faster than the rope.

It will be obvious that the important advantage is received by the arrangement that the horse is not required to go backward, and, further, that the rope is always overhead and out of the way of the horse.

The powers may be used elsewhere than in a barn—as for stacking hay or in a tile-factory.

I claim as my invention—

1. In combination with a hay-carrier and track of substantially the class described, a winding drum or wheel loose on its shaft, an ordinary horse-power mechanism within reach of the driver, for connecting or disconnecting at will the wheel and horse-power shaft, and a hoisting-rope of the carrier connected to the wheel, all substantially as described.

2. The combination of the track, the carrier and rope, and the wheel or drum loose on its shaft $d$, a pole for the horse, and mechanism for connecting or disconnecting the wheel and shaft within reach of the driver, all substantially as described.

3. In combination with an elevated carrier, a vertical shaft, a wheel loosely attached to its upper end, means for connecting the draft-animal to the shaft, devices for connecting or disconnecting shaft and wheel, and a rope to the carrier, adapted to be wound on the wheel, whereby the rope is kept out of the way of the animal, all substantially as described.

In testimony whereof I have signed my name to this specification in the presence of two subscribing witnesses.

JOHN S. GRABILL.

Witnesses:
D. S. SAMPSEL, Jr.,
I. E. STONE.